(No Model.)
J. B. READMAN.
PROCESS OF OBTAINING PHOSPHORUS.
No. 417,943. Patented Dec. 24, 1889.
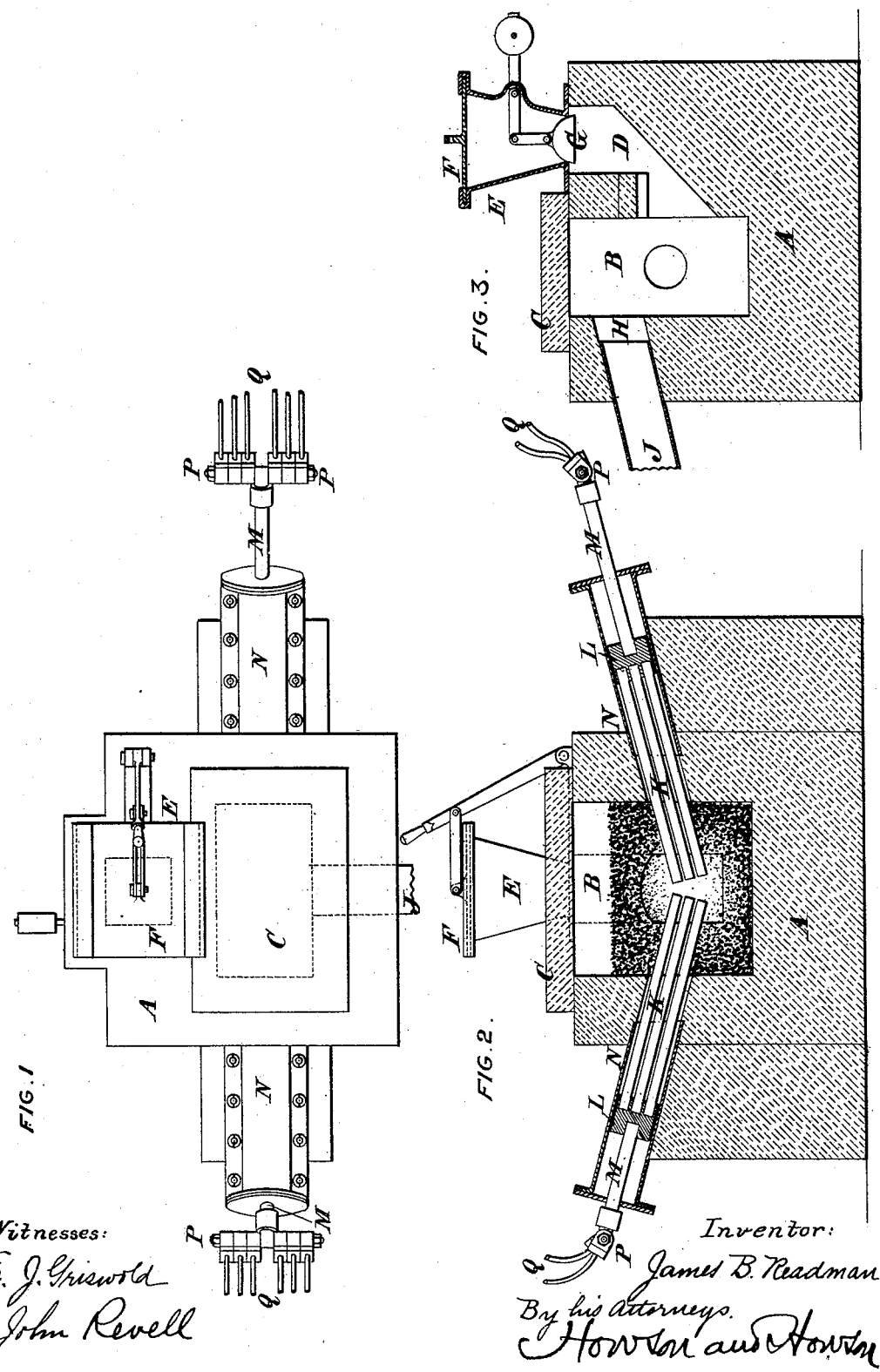

UNITED STATES PATENT OFFICE.

JAMES BURGESS READMAN, OF EDINBURGH, COUNTY OF MID-LOTHIAN, SCOTLAND.

PROCESS OF OBTAINING PHOSPHORUS.

SPECIFICATION forming part of Letters Patent No. 417,943, dated December 24, 1889.

Application filed June 26, 1889. Serial No. 315,631. (No model.)

*To all whom it may concern:*

Be it known that I, JAMES BURGESS READMAN, a subject of the Queen of Great Britain and Ireland, and a resident of Edinburgh, in the county of Mid-Lothian, Scotland, have invented a new and Improved Process for Obtaining Phosphorus, of which the following is a specification.

In the ordinary method of obtaining phosphorus it is customary to heat the selected and prepared phosphatic material to a high temperature in fire-clay or earthenware cylinders or retorts by means of an external fire consuming solid or gaseous carbonaceous fuel. The material introduced into the retorts is generally a desiccated mixture of crude phosphoric acid or acid phosphate of lime intimately mixed when in solution with charcoal, coke, or other carbonaceous substance. Sometimes other substances containing phosphorus in combination with a metal or base are employed; but in such cases it is frequently necessary to use, in conjunction with the carbonaceous material, silica or other acid or basic matter or salts in order to liberate the phosphorus. The cylinders or retorts are connected with condensers, and when the necessary temperature has been attained phosphorus distills over and is condensed under water. The very high temperature which has to be employed to effect complete reduction and liberation of phosphorus occasions excessive wear and breakage of the fire-clay cylinders or retorts, leading to great loss of material and largely increasing the cost of production.

My invention has for its object to diminish the wear of the apparatus and the waste and loss of materials, and in carrying out my invention, instead of applying heat to the external surface of vessels containing the phosphorus-yielding material mixed, as usual, with carbonaceous matter, I generate the heat within the containing-vessel and apply it directly into and through the materials themselves, at the same time maintaining a reducing atmosphere within the vessel and keeping up the temperature required for the decomposition without introducing oxidizing, reducing, or other gases.

In order to accomplish my purpose, I employ a suitable adaptation of what is known as an "electric" furnace, such as is shown on the accompanying sheet of drawings. I do not, however, restrict myself to any precise construction of the electric furnace.

Figure 1 of the drawings is a plan, and Figs. 2 and 3 are vertical sections at right angles to each other.

The furnace is formed in a building or structure A of fire-clay or other suitable refractory material, the furnace-chamber B being of a rectangular form open at the top, but covered by a removable fire-clay slab C. At one side of the furnace-chamber B there is a partly-inclined passage D for the introduction of materials, there being at the outer and upper end of this passage a hopper E with two valves F G. At the opposite side of the furnace-chamber B there is an outlet H, provided with a pipe J, for leading off the vaporized phosphorus to a condenser. At the other two sides of the furnace sets of carbon electrodes K are made to project into the chamber B, with their inner ends near each other. Each set of carbon electrodes K is fixed in a cast-iron block L, which has fixed to it a copper bar M, extending out through the end cover of a casing N, in which the block L is placed. To give convenient access to the block L and the electrodes K the casing N is made with its upper half removable. The copper bar M is formed with a cross-head P, on which are strung and fixed a number of conductors Q. These conductors Q are to be connected to a dynamo-electric machine or other suitable source of electricity, those from one side of the furnace going to the positive and those from the other side to the negative pole.

The phosphorus-yielding materials are to be placed in the furnace-chamber B, so as to occupy its center between and in the immediate neighborhood of the inner ends of the electrodes K, and so as to be embedded in and surrounded by coke or charcoal in moderately-sized pieces.

In preparing the phosphorus-yielding materials I may take a solution containing phosphoric acid or acid phosphate of lime, and after concentrating by evaporation I thoroughly incorporate with it carbon or carbonaceous material, and I expel the remaining moisture by careful desiccation; or I may take bone-ash, or one or other of the alkaline, earthy, aluminous, or metallic phosphates, or I may take one or other of the metallic phosphides. I mix the material with sufficient carbon for the complete reduction and liberation of the whole of its phosphorus, adding, if required, silica or silicious material or aluminous or other basic or acid substance or substances—as flux—to combine at high temperature with the earthy, aluminous, or metallic constituents of the phosphatic material.

Having charged the furnace with one or other of the phosphorus-yielding materials hereinbefore referred to, I carefully lute the furnace, and then cause to pass through it an electric current of sufficient intensity to produce incandescence at the center of the furnace, with the result that the phosphorus is rapidly reduced and distilled over.

What I claim is—

The process of obtaining phosphorus by subjecting materials containing it to heat generated within the furnace-chamber containing the materials and applied directly to them without introducing oxidizing, reducing, or other gases, substantially as herein set forth.

In testimony whereof I have signed my name to this specification in the presence of two subscribing witnesses.

JAMES BURGESS READMAN.

Witnesses:
 HUGH C. PEACOCK,
 NEIL BROWNLEE.